Feb. 18, 1964  E. H. FIELDS  3,121,401
AIR SUPPORTED VEHICLE
Filed Nov. 13, 1962  2 Sheets-Sheet 1
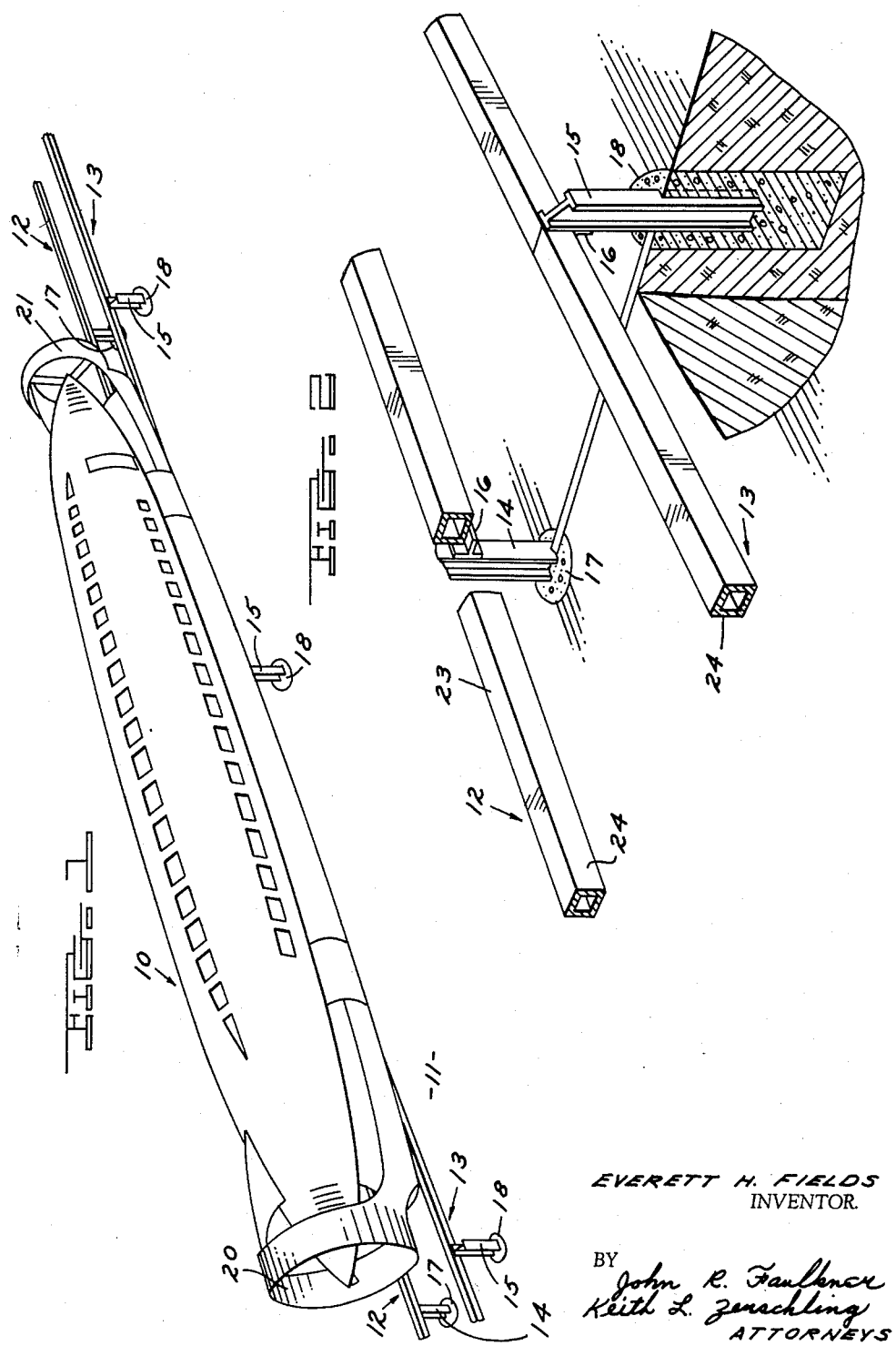
EVERETT H. FIELDS
INVENTOR.
BY John R. Faulkner
Keith L. Zerschling
ATTORNEYS

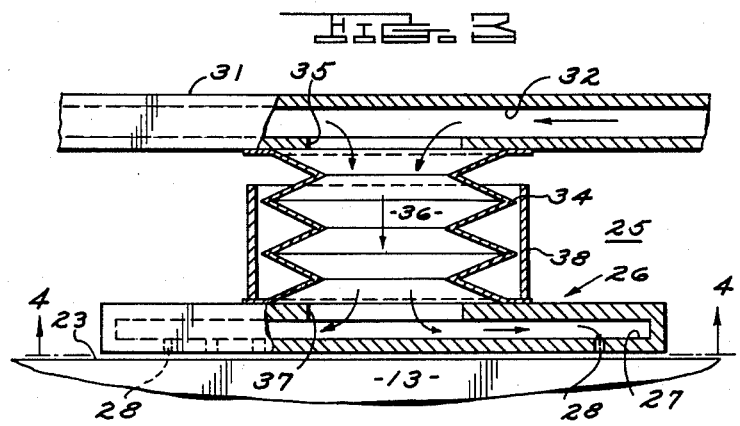
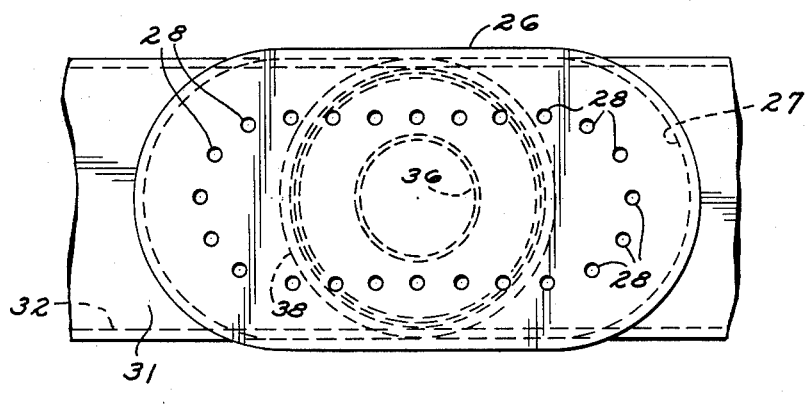

3,121,401
AIR SUPPORTED VEHICLE
Everett H. Fields, Taylor, Mich., assignor to Ford Motor Company, Dearborn, Mich., a corporation of Delaware
Filed Nov. 13, 1962, Ser. No. 236,941
6 Claims. (Cl. 104—134)

This invention relates to a high speed transportation system employing an air supported vehicle and more particularly to a combined pneumatic suspension and air pressure levitation system for such a vehicle.

In the preferred form of the invention, the vehicle is adapted for movement along a substantially horizontal surface. Means are carried by the vehicle, preferably air pressure levitation devices, in opposed relationship to the substantially horizontal surface for supporting the vehicle by means of a thin layer of air under pressure between this means and this surface. The air pressure levitation device is connected with a structural or frame member of the vehicle by means of a pneumatic suspension member that preferably takes the form of a flexible metal bellows. The frame member of the vehicle may also serve as an air manifold for supplying air to the bellows and to the air pressure levitation device.

When air is supplied from a source of air under pressure, for example, the air manifold mentioned above, to the air pressure levitation device through the flexible bellows, the flexible bellows serves as a means for springing the weight of the vehicle and as a means for transporting air to the air pressure levitation device. It also provides a mechanism for allowing the air pressure levitation device to align itself with the substantially horizontal surface over which the vehicle travels. A means is also provided for maintaining a clearance between a structural member of the vehicle and the air pressure levitation device when the air supply to the bellows and air pressure levitation device is shut down at times when the vehicle is not in operation. This stop means prevents collapse of the bellows at this time.

An object of the invention is the provision of a pneumatic suspension system for an air supported vehicle.

Another object of the invention is the provision of a pneumatic suspension system for an air supported vehicle that simultaneously provides for springing the weight of the vehicle and for properly aligning an air pressure levitation device with respect to a surface over which the vehicle travels.

A further object of the invention is the provision of a pneumatic suspension system for an air supported vehicle that includes a means for simultaneously springing the weight of the vehicle and for supplying air under pressure to an air pressure levitation device that is positioned in opposed relationship to the surface over which the vehicle travels.

A further object of the invention is the provision of a pneumatic suspension system for an air supported vehicle that includes means for simultaneously springing the weight of the vehicle, universally mounting an air pressure levitation device in opposed relationship to the surface over which the vehicle travels, and supplying the air pressure levitation device with air under pressure.

Other objects and attendant advantages of the invention will become more apparent as the specification is considered in connection with the attached drawings in which FIGURE 1 is a perspective view of the air supported vehicle and the rail system of the present invention;

FIGURE 2 is a perspective view, partially in section, of the rail system of the present invention;

FIGURE 3 is a side elevational view, partly in section, of the pneumatic suspension system of the present invention, and FIGURE 4 is a bottom plan view of the structure shown in FIGURE 3 taken along the lines 4—4 of FIGURE 3.

Referring now to the drawings in which like reference numerals designate like parts throughout the several views thereof, there is shown in FIGURE 1 a vehicle 10 positioned upon a rail system 11.

As shown in FIGURE 2 this rail system may comprise a pair of box-like rails 12 and 13 that are supported from pillars 14 and 15 by means of T-sections 16. The pillars 14 and 15 are supported from the ground by means of concrete foundations 17 and 18.

The vehicle 10 is suitable for carrying a number of passengers, and it includes a pair of propellers 20 and 21 positioned at either end for propelling it over the rails 12 and 13, each of which have a substantially horizontal surface 23 and a substantially vertical surface 24.

The vehicle is supported on the substantially horizontal surfaces 23 of the rails by a plurality of levitation and pneumatic suspension mechanisms 25, as shown in FIGURES 3 and 4, that may be spaced longitudinally along the length of the vehicle in opposed relationship to the surfaces 23 of the rails 12 and 13. As shown in FIGURES 3 and 4, each levitation and pneumatic suspension mechanism 25 includes an air pressure levitation device 26 that is positioned in opposed relationship to the substantially horizontal surfaces 23 of the rail 13. This air pressure levitation device is preferably of the type described in copending application S.N. 744,416, filed June 25, 1958, in the names of David J. Jay and Harlan W. Peithman; now Patent No. 3,097,718, and assigned to the assignee of the present invention. The air pressure levitation device 26 may be oblong in shape, as shown in FIGURE 4, and it includes a plenum 27 and a plurality of orifices each of which is designated by the numeral 28. Air issuing from the orifices 28 forms a thin layer of air under presure between the air perssure levitation devices 26 and the substantially horizontal surfaces 23 of the rails 12 and 13. The thin layer of air under pressure supports the vehicle in spaced relationship from the rails to provide substantially frictionless movement of the vehicle with respect to the rails as the vehicle is propelled by the propellers 20 and 21.

A structural or frame member 31 of the vehicle 10 preferably extends longitudinally on either side of the vehicle and in parallel relationship to the rails 12 and 13. The frame member may serve as an air manifold or source of air under pressure and is designed to have an air passage 32 that is connected to an air compressor (not shown). It is to be understood that an ordinary air compressor that is driven by engines of the vehicles would suffice for this purpose.

A pneumatic spring member or metal bellows 34 interconnects the structural member 31 and the air pressure levitation device 26. This pneumatic spring member or metal bellows may be suitably affixed over an aperture 35 in the structural member 31 so that the air passage 32 communicates with the interior 36 of the pneumatic spring member or metal bellows. Similarly, the pneumatic spring member or metal bellows is affixed over an aperture 37 in the air pressure levitation device 26 so that the interior 36 of the pneumatic spring member or metal bellows 34 communicates with the plenum 27 of the air pressure levitation device 26. This pneumatic spring member or bellows may be affixed to the structural member 31 and to the air pressure levitation device 26 by any suitable fastening means, for example, by welding.

As shown in FIGURES 3 and 4, a cylindrical stop member 38 surrounds the pneumatic spring member or metal bellows 34. This stop member has a length that provides sufficient clearance between the structural member 31 and the air pressure levitation device 26 to permit proper springing of the vehicle by means of the air under pressure in the interior 36 of the pneumatic spring member or metal bellows 34. When the vehicle is not in operation and air under pressure is not supplied to the interior 36 of the pneumatic spring member or metal bellows 34, it will collapse to the extent that the stop member 38 engages both the structural member 31 and the air pressure levitation device 26. The stop member 38 thus prevents the total collapse of the pneumatic suspension member or metal bellows 34 when air leaves the interior 36 through the plenum 27 and orifices 28 in the air pressure levitation device 26.

In the operation of the vehicle each structural or frame member 31 including air passage 32 provides an air manifold containing air under pressure that extends throughout the length of the vehicle on either side thereof and above the substantially horizontal surfaces 23 of the rails 12 and 13. This air under pressure fills the interior 36 of the pneumatic spring member or metal bellows 34 and the plenum 27 in the air pressure levitation device 26. The air in the plenum 27 flows through the orifices 28 positioned in the section of the air pressure levitation device 26 positioned in opposed relationship to the horizontal surfaces 23 of the rails 12 and 13 to form a thin layer of air under pressure between the air pressure levitation devices and the surfaces 23 of the rails. The capacity of the pneumatic spring member or metal bellows 36 is proportioned to the rate of air flow through the orifices 28 in the air pressure levitation device 26 so that the pneumatic spring member or metal bellows 34 carries the proper amount of air under pressure to act as means for springing the weight of the vehicle. This pneumatic spring member or metal bellows 34 also provides a means for mounting the air pressure levitation device 26 from the frame member 31 in a universal fashion so that the air pressure levitation device 26 may properly align itself with the substantially horizontal surface 23 of either rail 12 or 13, as the case may be, under all conditions of loading of the vehicle and may move to conform to any irregularities that may be present in the surfaces of the rails. The pneumatic spring member or metal bellows 34 also provides an air distribution means for the air under pressure that is supplied from the air manifold, formed by the passageway 32 in the structural member 31, to the air pressure levitation device 26.

Although the invention has been described in relation to a suspension system in which the air pressure levitation devices 26 are positioned in opposed relationship to the substantially horizontal surfaces 23 of the rails 12 and 13, such a system could also be used to position air pressure levitation devices such as those shown at 26 in opposed relationship to the substantially vertical surfaces 24 of the rails 12 and 13. The purpose of this type of an arrangement is to provide a means for controlling or restricting the lateral movement of the vehicle along the rail system.

Other systems for controlling or restricting the lateral movement of the vehicle 10 may be employed also, for example, the systems shown and described in copending application S.N. 162,901, filed December 28, 1961 in the name of David J. Jay, application S.N. 162,843 filed December 28, 1961 in the name of Victor G. Raviolo, and application S.N. 162,870, filed December 28, 1961 in the name of Andrew A. Kucher, now patent No. 3,086,479. All of these applications have been assigned to the assignee of the present invention.

The present invention thus provides a suspension system for an air supported vehicle that includes a pneumatic spring member for springing the weight of the vehicle as well as for universally mounting an air pressure levitation device from a structural member of the vehicle and for distributing air to the air pressure levitation device.

It will be understood that the invention is not to be limited to the exact construction shown and described, but that various changes and modifications may be made without departing from the spirit and scope of the invention as defined in the appended claims.

I claim:
1. In an air supported vehicle the combination comprising a structural member, said structural member including means forming an air passager for containing air under pressure, a bellows connected at one end to said structural member, said structural member having an opening for the passage of air from said structural member to said bellows, an air pressure levitation device connected to the other end of said bellows to receive air under pressure from said bellows, said air pressure levitation device being adapted to be positioned in opposed relationship to a substantially horizontal surface of a rail system whereby said vehicle may be supported on said substantially horizontal surface through said air pressure levitation device and said bellows.

2. In a high speed transportation system the combination comprising a rail having a substantially horizontal surface, a vehicle adapted for movement along said rail, said vehicle including a structural member having an air passage therein for containing air under pressure, an air pressure levitation device positioned adjacent said substantially horizontal surface of said rail for supplying a thin film of air under pressure between said substantially horizontal surface and said air pressure levitation device, and means interconnectiong said structural member and said air pressure levitation device for both springing the weight of the vehicle and supplying air to said air pressure levitation device.

3. The high speed transportation system of claim 2 in which said means consists of a bellows.

4. In a high speed transportation system the combination comprising a rail having a substantially horizontal surface, a vehicle adapted for movement along said rail, said vehicle including a source of air under pressure, an air pressure levitation device positioned adjacent said substantially horizontal surface of said rail for supplying a thin film of air under pressure between said substantially horizontal surface and said device, and a pneumatic spring member interconnecting said vehicle and said air pressure levitation device and being connected to said source of air under pressure for both springing the weight of the vehicle and supplying air to said gas pressure levitation device.

5. In a high speed transportation system the combination comprising a rail having a substantially horizontal surface, a vehicle adapted for movement along said rail, said vehicle having a frame member including a passage for containing air under pressure, an air pressure levitation device positioned adjacent said substantially horizontal surface of said rail, and a bellows directly interconnecting said frame member and said air pressure levitation device, said frame member including an opening connected to said bellows for supplying said bellows with air under pressure, said bellows springs the weight of said vehicles and furnishing a means for supplying air to said air pressure levitation device.

6. The high speed transportation system of claim 5 in which a stop means is positioned between said air pressure levitation device and said frame member for supporting said vehicle when air under pressure is not supplied to said bellows and said air pressure levitation device.

References Cited in the file of this patent

UNITED STATES PATENTS

| | | |
|---|---|---|
| 1,727,720 | Kruckenberg | Sept. 10, 1929 |
| 2,869,479 | Hutchinson | Jan. 20, 1959 |
| 2,900,924 | Furrer et al. | Aug. 25, 1959 |
| 3,013,505 | Burke | Dec. 19, 1961 |
| 3,082,836 | Billman | Mar. 26, 1963 |